United States Patent
Nguyen et al.

(10) Patent No.: US 7,216,063 B2
(45) Date of Patent: May 8, 2007

(54) METHOD AND APPARATUS FOR COMPARING A DATA SET TO A BASELINE VALUE

(75) Inventors: Phuc Luong Nguyen, Brossard (CA); Denis Collin, St. Hubert (CA); Peter Matschek, Lachine (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 11/104,646

(22) Filed: Apr. 13, 2005

(65) Prior Publication Data
US 2005/0209823 A1  Sep. 22, 2005

Related U.S. Application Data

(63) Continuation of application No. 10/455,367, filed on Jun. 6, 2003, now Pat. No. 7,039,554.

(51) Int. Cl.
*G06F 7/02* (2006.01)
(52) U.S. Cl. .................. 702/193; 702/190; 702/194; 702/195
(58) Field of Classification Search ................ 702/190, 702/193, 194, 195
See application file for complete search history.

(56) References Cited

U.S. PATENT DOCUMENTS

| | | | | |
|---|---|---|---|---|
| 4,634,110 | A * | 1/1987 | Julich et al. | 714/11 |
| 6,027,941 | A * | 2/2000 | Jarvie et al. | 436/173 |
| 6,606,693 | B1 * | 8/2003 | Morris | 711/161 |
| 6,754,569 | B2 * | 6/2004 | Bechhoefer | 701/29 |
| 2003/0109951 | A1 * | 6/2003 | Hsiung et al. | 700/108 |

* cited by examiner

*Primary Examiner*—Marc S. Hoff
*Assistant Examiner*—Felix Suarez
(74) *Attorney, Agent, or Firm*—Ogilvy Renault LLP (57) ABSTRACT

A method and system are disclosed for comparing a data set to a baseline value for use in data analysis of the data set having a plurality of data points, the method comprising providing the data set to be analyzed, locating potentially bad data points in at least a portion of the data set using an odd-man out recursive technique, preparing a baseline set by discarding the potentially bad data points from the at least a portion of the data set and calculating a baseline value from the baseline set.

18 Claims, 7 Drawing Sheets

Fig. 5a  SPEED

Fig. 5b  T

Fig. 5c  FUEL FLOW

Fig. 6a SPEED

Fig. 6b T

Fig. 6c FUEL FLOW

Fig. 7

METHOD AND APPARATUS FOR COMPARING A DATA SET TO A BASELINE VALUE

CROSS-REFERENCE TO RELATED APPLICATIONS

The present application claims priority of patent application Ser. No. CA 2,417,074 filed on Jan. 24, 2003 by Applicant and is a continuation of U.S. patent application Ser. No. 10/455,367 filed Jun. 6, 2003, now U.S. Pat. No. 7,039,554, the specifications of which are hereby incorporated by reference.

FIELD OF THE INVENTION

The invention relates to a process of trend detection and analysis in data. More specifically, it relates to novel processes for one or more of smoothing a data signal, removing low frequency noise effects, calculating a comparison baseline and detecting trends to identify alert conditions.

BACKGROUND OF THE INVENTION

Various conventional computer-based analysis methods are employed to analyze complex data collected from sensors which are monitoring equipment or process operations. In one approach, sensor signal data is compared against stored or predetermined thresholds and, when the data signals exceed the thresholds, an "alert" is automatically generated for notifying a human of the situation. Thus, equipment or process monitoring requires human intervention only when a sensor data exceeds a corresponding threshold. Alerts are thus typically the goal of the entire process in an industrial or technological context. To assist in the accuracy of the analysis, it is well-known to "smooth" the data prior to analysis, to remove extraneous, spurious or transient data points (e.g. a start-up spike) prior to comparison, in an effort to make the auto-analysis more reliable. Conventional computerized methods then typically involve one or more of the following basic steps in a typical data analysis: a) Smooth data (remove noise and outliers); b) Select, determine or calculate baseline; c) Compare smoothed data against baseline; d) Mark alerts when a certain threshold is exceeded.

One example of a process to be monitored is the operational performance of a gas turbine engine, wherein performance data such as low compressor speed (NL), high compressor speed (NH), inter-turbine temperature (ITT), fuel flow (Wf), etc. are typically monitored and recorded during engine operation. This data is then analyzed to verify that the engine is running properly and to permit actual or potential maintenance situations to be detected.

Conventional data analysis methods of the type described, however, when used on complex data, typically suffer from large numbers of false alerts (e.g. if thresholds are set too close to normal operating levels, or alert conditions are otherwise improperly marked) and/or of large numbers of missed alerts (e.g. if the thresholds are set too expansively, or alert conditions are otherwise missed). While false alerts reduce the operator's or service technician's confidence in the trend detection process, missed or delayed alerts can result in serious maintenance issues downstream. Sources of error include the use of statistical smoothing techniques, such as 15-point rolling average and exponential smoothing, which make data "too smooth" by improperly removing critical data points.

Another problem encountered when doing data analysis of this type is the presence of noise in the engine parameters. This noise should be removed from the data because it is not generally symptomatic of an engine condition. The prior art includes the use of various techniques, such as the use of Fast Fourier Transforms (FFT) algorithms to remove high frequency noise. However, other types of noise, such as low frequency noise may cause an automatic analysis system to miscalculate alerts. For example, in the operation of a machine, the seasonal variation in environmental operating conditions may affect parametric data relating to temperature, humidity, etc., yet the prior art does not adequately account for such factors.

Still another problem is how to calculate an accurate baseline for use in analyzing engine performance data. In the prior art, a new (or recently overhauled) engine is assumed to work "perfectly", so, typically the first dozen (or so) data points are taken as the baseline for the rest of the data, typically by using averaging and/or regression techniques to arrive at a "baseline" value. However, the prior art does not account for the fact that there may be an immediate deterioration in the data as parts and subassemblies may settle somewhat, causing "slippage" (actually or metaphorically) in the system which may cause a baseline calculated from these first data points to be inaccurate. The difficulty is, however, that the first data points are typically the "best" baseline data available, and so they should not simply be ignored indiscriminately. Therefore, an improved method of calculating a baseline for machine performance data would be desirable.

Some of these problems have been addressed without success by the prior art systems. Others of these problems have not even been recognized by the prior art. Accordingly, there is a need for improved methods of data analysis and trend detection.

SUMMARY OF THE INVENTION

Accordingly, an object of the present invention is to provide improved data analysis techniques and processes, which are also amenable to automation. In one aspect, the present invention comprises a method for removing very low frequency noise (e.g. seasonal effects on temperature, cyclical effects on stock market data) from parametric data. In another aspect, the present invention comprises a method for smoothing parametric data. In another aspect, the present invention comprises a method for calculating a parametric baseline for use in a later data analysis step. In still another aspect, the present invention comprises system(s) and/or software for performing one or more of the novel methods disclosed herein.

According to one broad aspect of the present invention, there is provided a method for comparing a data set to a baseline value for use in data analysis of the data set having a plurality of data points, comprising: providing the data set to be analyzed; locating potentially bad data points in at least a portion of the data set using an odd-man out recursive technique; preparing a baseline set by discarding the potentially bad data points from the at least a portion of the data set; and calculating a baseline value from the baseline set.

According to another broad aspect of the present invention, there is provided a method for smoothing a data set for use in data analysis of the data set having a plurality of data points, comprising: providing the data set to be analyzed; determining a baseline value from at least a portion of the data set; smoothing the data set to diminish an effect of extraneous data points and obtain smoothed data, wherein the smoothing includes using a low-point weighted average and regression technique.

According to another broad aspect of the present invention, there is provided a method for removing very low frequency noise from a time-based data set for use in data analysis of the time-based data set having a plurality of data points, comprising: providing the time-based data set to be analyzed; determining a baseline value from at least a portion of the data set; smoothing the data set to diminish an effect of extraneous data points and obtain smoothed data, wherein the smoothing includes using a Fast Fourier Transform (FFT) algorithm to transfer the time-based data set into a frequency based data set; attenuating low frequencies of the frequency-based data set; and using an inverse Fourier Transform (IFT) algorithm to transfer the attenuated frequency based data set into an attenuated time-based data set.

According to another broad aspect of the present invention, there is provided a method for smoothing a data set for use in data analysis of the data set having a plurality of data points, comprising: providing the data set to be analyzed; locating potentially bad data points in at least a portion of the data set using an odd-man out recursive technique; preparing a baseline set by discarding the potentially bad data points from the at least a portion of the data set; and calculating a baseline value from the baseline set; and smoothing the data set to diminish an effect of extraneous data points and obtain smoothed data, wherein the smoothing includes using a two-pass weighted average and regression technique.

According to another broad aspect of the present invention, there is provided a method for smoothing a time-based data set for use in data analysis of the data set having a plurality of data points, comprising: providing the data set to be analyzed; locating potentially bad data points in at least a portion of the data set using an odd-man out recursive technique; preparing a baseline set by discarding the potentially bad data points from the at least a portion of the data set; calculating a baseline value from the baseline set; and smoothing the data set to diminish an effect of extraneous data points and obtain smoothed data, wherein the smoothing includes using a Fast Fourier Transform (FFT) algorithm to transfer the time-based data set into a frequency based data set; attenuating low frequencies of the frequency-based data set; and using an Inverse Fourier Transform (IFT) algorithm to transfer the attenuated frequency based data set into an attenuated time-based data set.

According to another broad aspect of the present invention, there is provided a system for comparing a data set to a baseline value for use in data analysis of the data set having a plurality of data points, comprising: a data provider for providing the data set to be analyzed; an odd-man out locator for locating potentially bad data points in at least a portion of the data set using an odd-man out recursive technique; a data discarder for preparing a baseline set by discarding the potentially bad data points from the at least a portion of the data set; and a baseline calculator for calculating a baseline value from the baseline set.

According to another broad aspect of the present invention, there is provided a system for smoothing a data set for use in data analysis of the data set having a plurality of data points, comprising: a data provider for providing the data set to be analyzed; a baseline calculator for determining a baseline value from at least a portion of the data set; a data smoother for smoothing the data set to diminish an effect of extraneous data points and obtain smoothed data, wherein the smoothing includes using a low-point weighted average and regression technique.

According to another broad aspect of the present invention, there is provided a system for removing very low frequency noise from a time-based data set for use in data analysis of the time-based data set having a plurality of data points, comprising: a data provider for providing the time-based data set to be analyzed; a baseline determiner for determining a baseline value from at least a portion of the data set; a low frequency noise data smoother for smoothing the data set to diminish an effect of extraneous data points and obtain smoothed data, wherein the smoothing includes using a Fast Fourier Transform (FFT) algorithm to transfer the time-based data set into a frequency based data set; attenuating low frequencies of the frequency-based data set; and using an inverse Fourier Transform (IFT) algorithm to transfer the attenuated frequency based data set into an attenuated time-based data set.

According to another broad aspect of the present invention, there is provided a system for smoothing a data set for use in data analysis of the data set having a plurality of data points, comprising: a data provider for providing the data set to be analyzed; an odd-man out locator for locating potentially bad data points in at least a portion of the data set using an odd-man out recursive technique; a data discarder for preparing a baseline set by discarding the potentially bad data points from the at least a portion of the data set; and a baseline calculator for calculating a baseline value from the baseline set; and a data smoother for smoothing the data set to diminish an effect of extraneous data points and obtain smoothed data, wherein the smoothing includes using a two-pass weighted average and regression technique.

According to another broad aspect of the present invention, there is provided a system for removing very low frequency noise from a time-based data set for use in data analysis of the time-based data set having a plurality of data points, comprising: a data provider for providing the time-based data set to be analyzed; a baseline determiner for determining a baseline value from at least a portion of the data set; a low frequency noise data smoother for smoothing the data set to diminish an effect of extraneous data points and obtain smoothed data, wherein the smoothing includes using a Fast Fourier Transform (FFT) algorithm to transfer the time-based data set into a frequency based data set; attenuating low frequencies of the frequency-based data set; and using an inverse Fourier Transform (IFT) algorithm to transfer the attenuated frequency based data set into an attenuated time-based data set.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENTS

The present invention relates to a technique for analyzing trends in data. In the particular embodiment described, the data is typical gas turbine engine performance data of the general type displayed graphically in FIGS. 5 and 6, and which may typically include measured parameters such as compressor speed (NL for low pressure compressor and NH for high pressure compressor), inter-turbine temperature (ITT), fuel flow (WF), main oil pressure and temperature (MOP and MOT, respectively), etc. However, it will be understood by one skilled in the art that the data could come from any source if proper parameters are chosen and appropriate knowledge databases are used as necessary.

Figure 1:
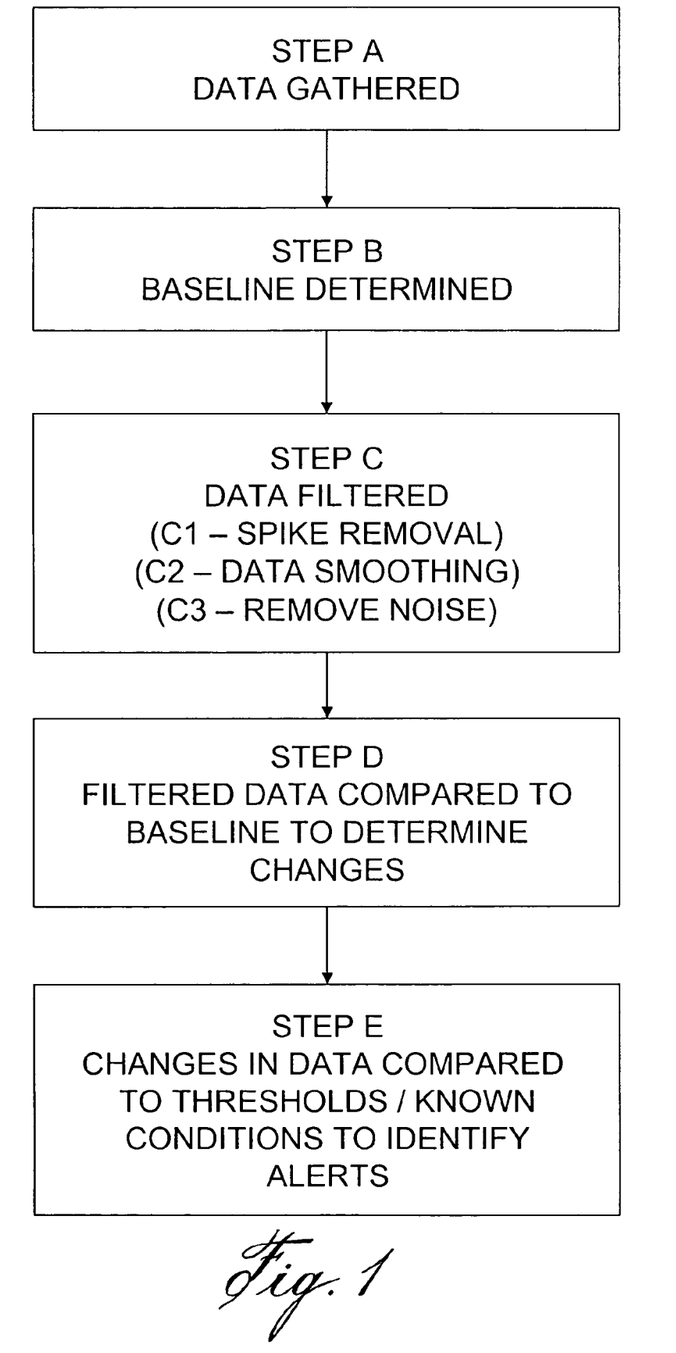
FIG. 1 is a flow chart of the basic step elements of a combined method of the present invention.

The described embodiment relates generally to a gas turbine engine performance parameter trend detection and analyzer method and system as depicted in overview in FIG. 1. Each step will be described briefly here, and in more detail below. In Step A, engine performance data is gathered (in any suitable fashion) and includes one or more engine parameters suitable for use in monitoring the health and performance of the engine (this data is referred to herein as the "unsmoothed data"). In Step B, the baseline datum against which each parameter is to be evaluated (referred to herein as the "baseline") is selected or determined. In Step C, the data is then "filtered" by, in Step C1, removing any extraneous or outlying data points (i.e. "spikes"), in Step C2, by smoothing the data, and then, in Step C3, by removing (if necessary) any noise in the data, and in particular in this embodiment, low frequency noise caused by seasonal variation in engine operating conditions (referred to herein as the "seasonal effect"). In Step D, the filtered data is then compared to its relevant baseline to determine the variance of the data from the baseline. In Step E, the variance data from all parameters is then preferably analyzed together and compared to known engine conditions to determine whether a particular performance condition (e.g. a malfunction, a performance deterioration, or other condition requiring attention) exists and, if so, a corresponding marker data is registered or recorded (referred to herein as an "alert"). This general combined method is similar to the prior art, with the exception of how the individual steps may be performed. One skilled in the art will appreciate that the order of the steps need not be as depicted in FIG. 1, and that all steps may not be necessary in all situations. The individual elements of this embodiment will now be described in detail.

Preferably, in the described embodiment, prior to the execution of the steps shown generally in FIG. 1 (i.e. calculating a baseline, filtering & smoothing the data, etc.), the raw data is "normalized" to remove its dependence on environmental factors (for example). This is done preferably by calculating the difference (a.k.a. the "delta") between each data point in each data signal and its respective "expected" value, calculated by specific engine performance equations (see, for example, item 22 in FIG. 3). It is preferably this "delta data" that will be processed and analyzed using the techniques of the present invention, as described below, rather then the original collected data. (Throughout this specification, the term "delta" is used to refer to the mathematical difference between a data point and its respective baseline, whereas the term "change" is used to refer to a variance (gradual or immediate) of the data away from the baseline.) "Delta" (i.e. normalized) data is generally determined by comparing raw (i.e. measured) data to a predicted value predetermined for, in this example, the particular type of engine being examined. The predicted values may be determined from performance equations which are predictive of the particular engine's expected or "normal" performance, based on inputs such as actual flight conditions, such as ambient conditions and power settings, etc. In the case of engine performance trending, using delta data allows one to eliminate the dependency of the trended parameters (ITT, Nh, NL, and Wf, etc.) on the ambient conditions (e.g outside temperature, indicated airspeed, and altitude, etc.) so that parameters can be compared at the same reference. It is included normalization process and reference performance equations. Thus, preferably such independent data is used (i.e. the parameters do not depend on another parameter) and, thus, if raw sensor data of is deemed to be independent of others, or always taken with reference to the same conditions (e.g. same altitude, same outside temperature, at the same speed, and at same load condition), or is otherwise independent, then the present invention's techniques can be applied directly most effectively. It is understood, however, that the use of delta data is only preferred, but not required.

In the general method of FIG. 1, the preferred first data processing step (Step B) is to determine a baseline. If necessary, the unsmoothed delta data is ordered in chronological order. In this embodiment, because each gas turbine operates at slightly different operating conditions, due to individual variations in setup, etc., a baseline for each parameter may be pre-determined without reference to the data, but is more preferably determined from the parametric data itself. In the prior art, the first few (e.g. 15) data points were simply averaged to determine a baseline value (or "norm") for the data. However, a difficulty with gas turbine operating data (and, in fact, most mechanical systems suffer from this), is that there often may be an immediate deterioration in the data after assembly or re-assembly, as parts and subassemblies may settle somewhat, as described in the Background of the Invention section above. To address this potential inaccuracy, unlike prior art techniques, the present invention employs an "odd-man out" recursive technique to locate and discard a pre-designated number of potentially "bad" data points to achieve using a "target" number of "good" data points to calculate the baseline value, as is more particularly described in the following paragraphs.

Figure 2:
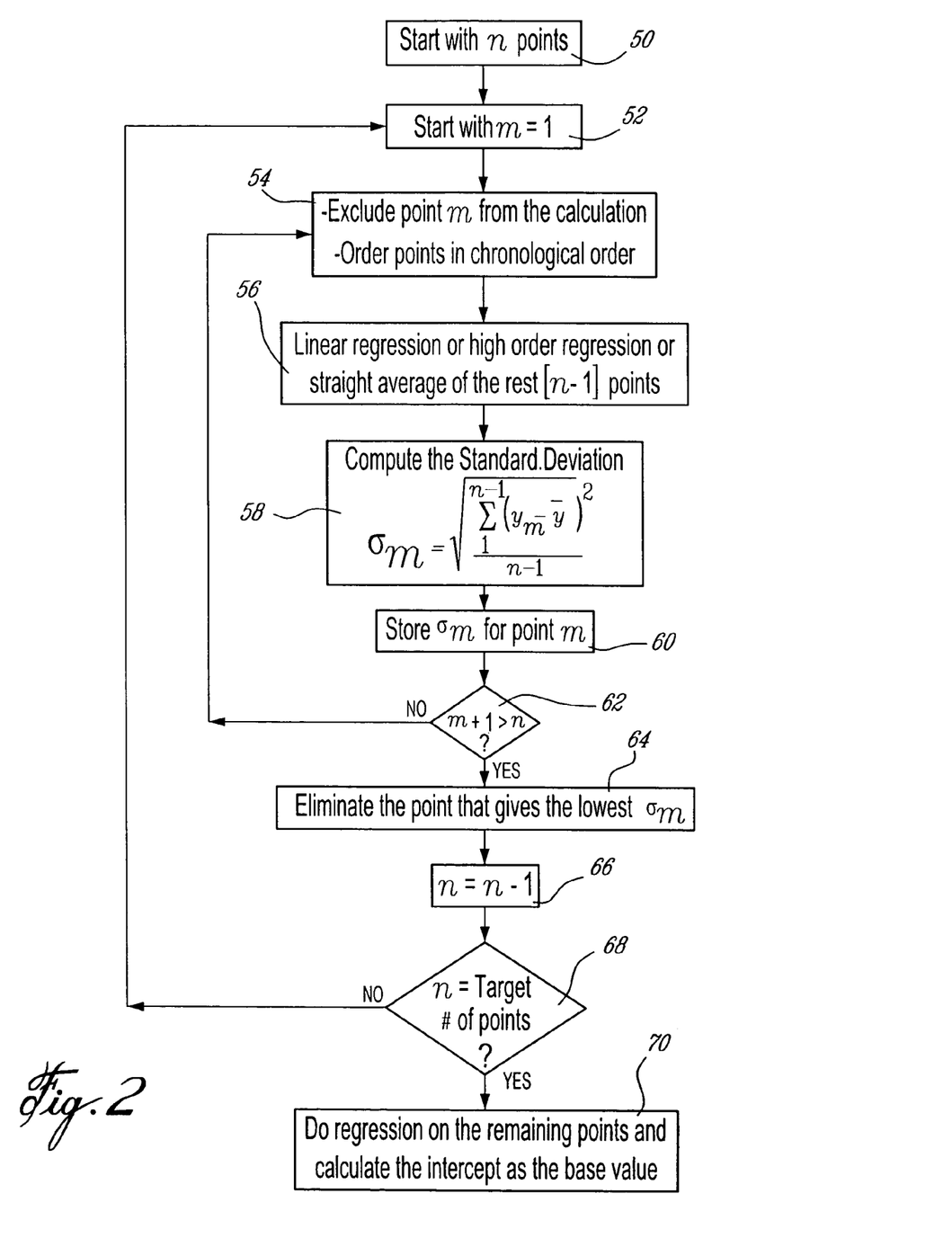
FIG. 2 is a flow chart of a baseline calculation process for use in the method of FIG. 1.

Referring to FIGS. 1 and 2, the baseline calculation technique of the present invention is performed on each of the sensor signals from the engine performance data (i.e. the delta data) to determine a baseline for each parameter. The algorithm preferably begins with the first n points in the data signal, and then discards x points to achieve the "target" number of best data points. For the embodiment described, the inventors prefer beginning with n=15 and x=5 to arrive at 10 "good" data points to use in the baseline calculation. The recursive algorithm used is as follows: the first n data points (here, preferably 15) from the data signal are selected 50. An index m is set to "1" at step 52 and point m (which corresponds to the first data point of the data signal) is then temporarily ignored and a linear regression, high order regression or simple averaging is then performed on the remaining (n−1) points 56 in the n set (a linear regression is preferred by the inventors). The standard deviation is then calculated 58 for the (n−1) points, preferably as follows:

$$\sigma_i = \sqrt{\frac{\sum_{1}^{n-1}(y_i - \bar{y})^2}{n-1}}$$

wherein $\sigma_i$ is the standard deviation and $y_i$ is the individual value of the (n–1) data points. The standard deviation is stored 60 in correlation to the ignored $m^{th}$ data point, and the process is repeated 62 until m=n (i.e. when m=2, the second data point is temporarily ignored (hence the coined term "odd-man out") and the standard deviations of the other n–1 points are calculated, and the result stored corresponding to the second point, until each of these n points has an associated standard deviation calculated). The standard deviation values are then compared 64 and the point in the n set having the lowest standard deviation is removed 64 (since it is thus the greatest outlier). The counter n is then set 66 to n–1 to account for the discarded point and checked at 68 to determine whether the target number of points has been reached. If not, steps 52 to 68 are repeated, and the next point with the smallest odd-man out standard deviation is also discarded, and so on, until the target number of data points is reached. When n=the target number, a second linear regression is preferably done (could also be a simple average or higher-order regression) on the target (i.e. "good") points and the intercept (or average, as the case may be) is calculated 70 to yield the calculated baseline value for that parameter. A baseline is calculated for each parametric data to be analysed.

Figure 3:
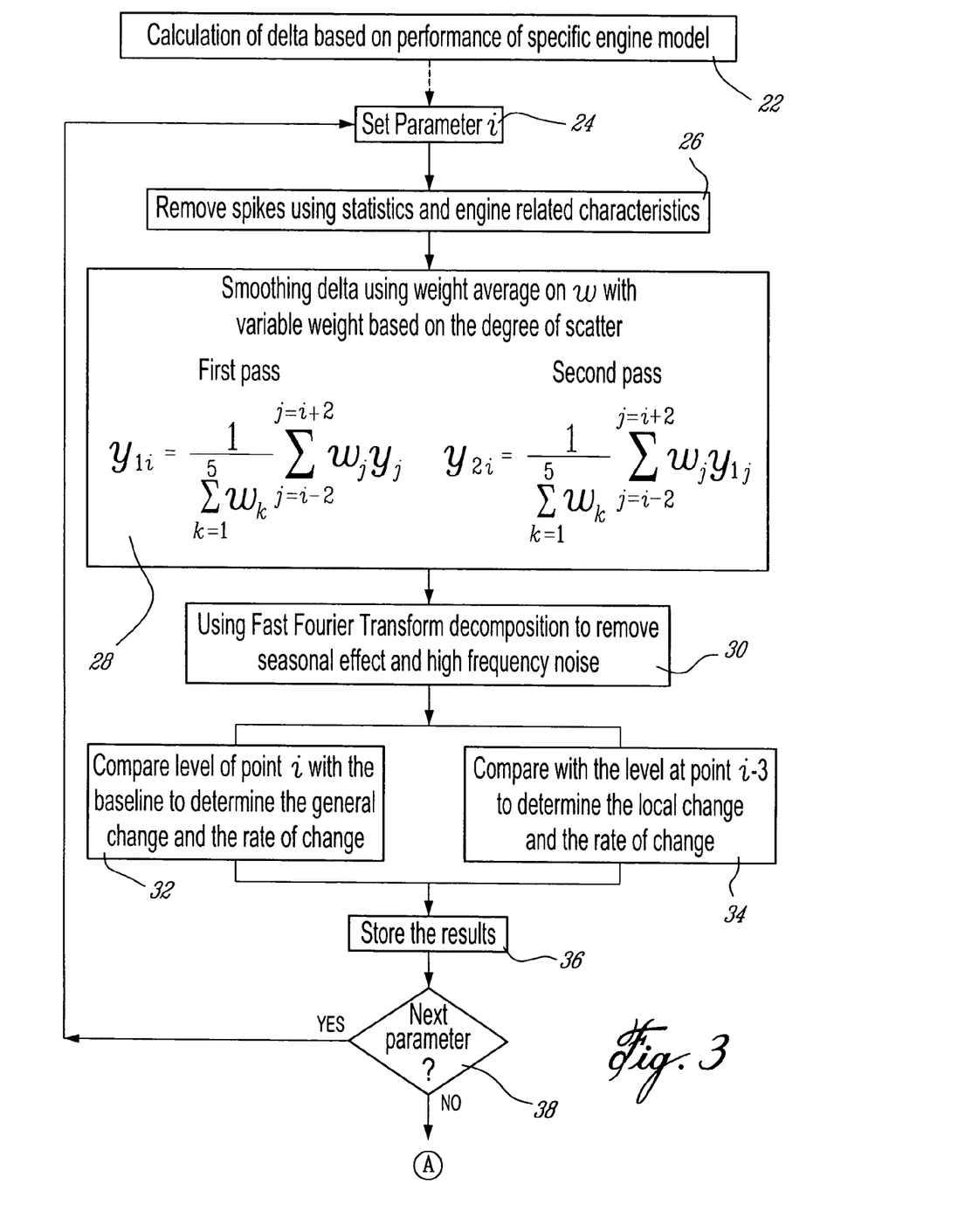
FIG. 3 is a flow chart of a data smoothing technique for use in the method of FIG. 1.

Referring now to FIGS. 1 and 3, the data filtering technique of the present invention will now be described. The smoothing technique of this embodiment involves the steps of spike removal, a low-point weight-averaging of the data and removing high frequency and low frequency noise, as will be each described in more detail below.

In the process depicted in FIG. 3, a counter or index is preferably used to facilitate automated execution of the calculations. Thus an index or counter i is set and maintained 24 accordingly, the results of the steps following are stored 36 and the steps are repeated 38 until performed on each data point in the set, as desired.

As a first step, each data point is examined for local spikes which, if found, are then removed 26 from the delta data (it being understood that transient spikes are a typical component of almost any type of data and are preferably ignored when such data is to be analyzed for longer term trends). Any threshold or a statistical type approach (or other approach) may be used for spike removal. An example threshold approach is to pre-specify a threshold value (typically the threshold would be related to system characteristics (e.g. a specific engine model) and/or based on the accuracy of its instrumentation/sensor, etc.) and then the threshold is used to locate and remove the spikes by discarding any data point which exceeds the threshold. In another example, the threshold can be obtained using a statistical approach that reflects the "scaffered-ness" of the data. (e.g. the threshold can be three times the standard deviation, and any points outside this range are considered spikes and discarded accordingly). The algorithm preferred by the inventors to determine and remove spikes is along the lines of the first concept above, as follows: A data point is considered a spike and thus removed if: (1) It is higher or lower than both of two neighboring points (i.e. one on each side); and (2) Its absolute difference from the two neighboring points is greater than a predetermined threshold. The pre-determined threshold is determined based on the particular machine characteristics, instrument/sensor characteristics and error, etc.

Referring still to FIGS. 1 and 3, once any spike has been corrected (as necessary), the data point is then preferably smoothed. In the prior art, the problem seen by the inventors is over-smoothing. Thus, a technique must be found which retains the step changes in the data as much as possible, and yet still also smoothes out the curve as much as possible. According to the present invention, then, smoothing is achieved using a weighted-average and regression technique, as follows. First, a weighted-average value which takes into account data points (again, in this embodiment it is the delta data being analyzed) both before and after the current point, is evaluated recursively 28, as described below. The weight factor is preferably chosen to be small enough to retain the step changes and yet large enough to also smooth out the curve. The inventors have found that a low-point weighted average is highly effective in achieving these goals. In the present example, a 5-point weighted average has been found to satisfactorily achieve this goal. The variable weight chosen is based on the degree of scatter in the data. The equation is adjusted accordingly for the first and last points. The weighted-average calculation algorithm for the first pass of the smoothing is as follows:

$$y_{1i} = \frac{1}{\sum_{k=1}^{5} w_k} \sum_{j=i-2}^{j=i+2} w_j y_j$$

where i is the parameter value that is being addressed, j goes from i–2 to i+2 (in a five-point average), $w_j$ is the weighting assigned for each j point in the calculation (here, for a 5-point average in gas turbine data analysis, weights of 0.1, 0.2, 0.4, 0.2 and 0.1 for each of j=i–2 to i+2 respectively, are preferred), k goes from 1 to the number of points of the average (which is, again, in this case 5), and $y_j$ is the value of data point j. After the first pass through the data is computed, a second pass is then performed and the algorithm preferably used for the second pass of the smoothing is similar, as follows:

$$y_{2i} = \frac{1}{\sum_{k=1}^{5} w_k} \sum_{j=i-2}^{j=i+2} w_j y_{1j}$$

where $y_{1j}$ is the corresponding weight-averaged value from the first pass, described above.

The data point is then further filtered to remove noise from the data. In particular, according to the present invention, the data is filtered to remove any low frequency noise (e.g. seasonal variation) to further locally smooth the curve. According to the method of the present invention, a standard Fast Fourier Transform (FFT) algorithm is used 30 to remove a certain number (here, preferably two) of the lowest frequencies in the data, as the inventors have recognized that these frequencies are likely to be noise, in this example, caused by seasonal variations in environmental operating conditions. Counter to the prior art, which uses FFT techniques to remove only high-frequency noise, the present invention is novel in that FFT techniques are applied to remove low frequency noise. To remove the seasonal effect according to the present invention, then, it has been found that preferably a minimum of the two lowest frequencies should be ignored. The calculation is done by setting the FFT coefficients that are to be ignored to be zeros—in other words, the FFT coefficients corresponding to the two lowest frequencies are preferably set to zero, so that the FFT calculation will negate the effect of these two frequencies on the data point. To further improve local smoothness, higher frequencies are also ignored (preferably up to 30%) using any method, though the use of FFTs is again preferred. The skilled reader will recognize that the above steps could be performed in various combinations and orders.

Once the filtered delta data is obtained, the global change and local change trends are determined 32 and 34. Preferably global change is determined by comparing 32 the data point i with its relative baseline value. The local change is preferably calculated using a simple derivative-type calculation, wherein the local change and local rate of change is determined by comparison of the value at the point with the value at a previous (i.e. in time) point or points. (In FIGS. 5 and 6, time is shown from left to right; a "previous" point is to the left of a point under consideration). In the preferred embodiment, a point i is compared with a previous point outside the original n-point weighted average smoothing calculation (described above) to prevent neighbouring points from directly affecting each other in this averaging process. Here, because a 5-point average was used above in this example, the point i is compared 34 the point i-3 (i.e. third previous point) to calculate the local change and rate of change. Once filtering and the corresponding change and rate of change information has been computed, all results are preferably stored 36 for use in the alert identification process, described below.

As mentioned above, the steps 24 to 36 are performed for each parameter of the data until all data signals have been processed 38. The processing may be executed sequentially or in parallel.

Figure 4:
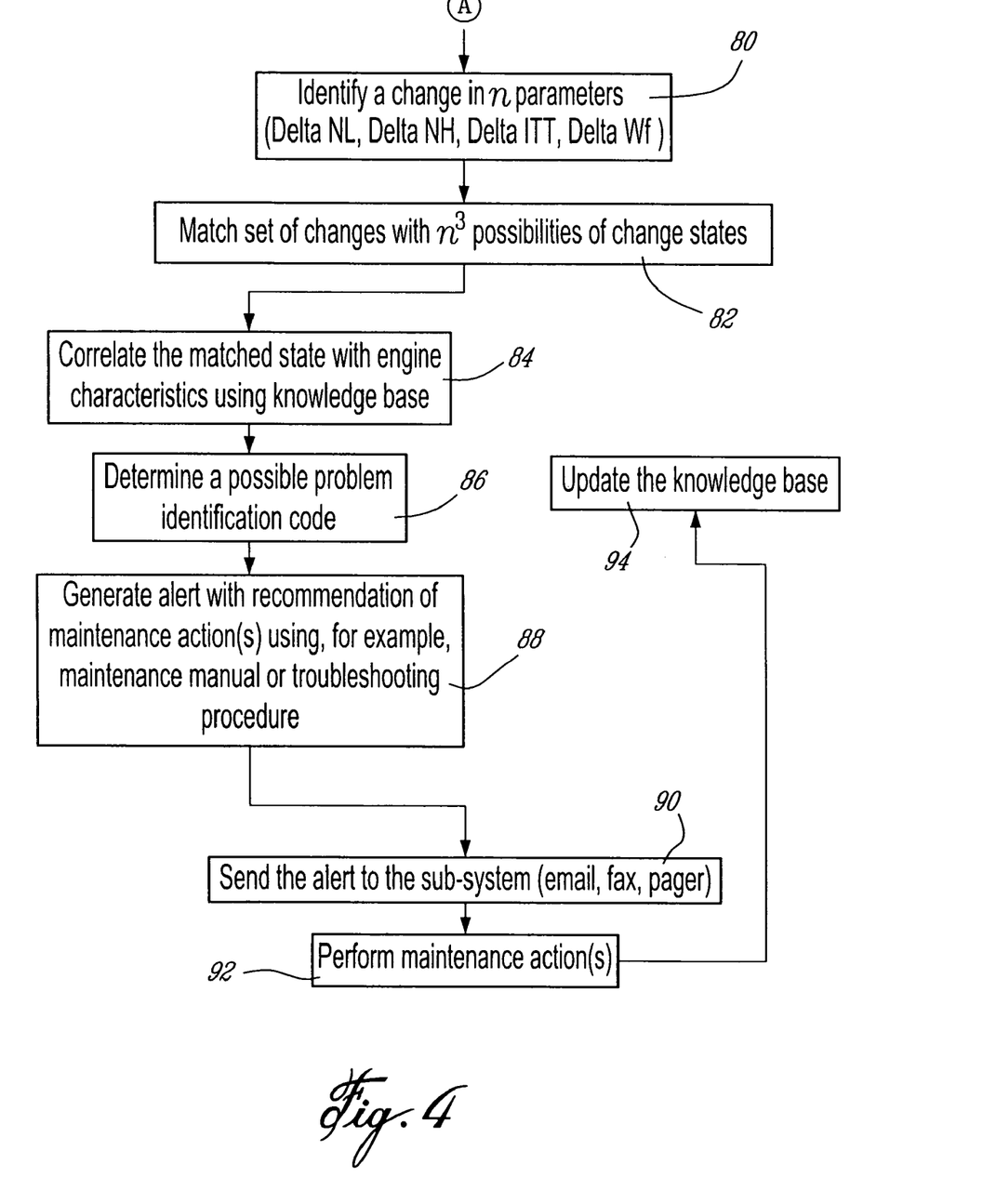
FIG. 4 is a flow chart of a data analysis technique for use in the method of FIG. 1.

Referring now to FIGS. 1 and 4, the next step is to review the data and mark alert conditions. A multiple parameter analysis is preferably performed, wherein trends in different parametric data are compared to determine engine performance conditions, which tends to give a more complete "view" of the engine condition. Of course, the techniques of the present invention may also be applied to a single parameter analysis.

Briefly, trends are identified and alerts marked by using a predetermined "acceptable" threshold value as a comparator for each parameter, which may be either generic or data specific. An alert is thus generated preferably based on an analysis of (a) the global change (i.e. the difference between the base value and the smoothed value), and/or (b) the local change (i.e. difference between the smoothed value and a previous smoothed value), the calculation of both of which are described above. From the results of (a) and (b) the alert can be marked and classified as a "step" change or "gradual" change. (It will be understood that a "step" change is one in which there is an instantaneous change in the data over very few successive data points, whereas a "gradual" change is a change which occurs (often in a drifting fashion) usually over many successive data points). The engine conditions or problems may then be determined by an analysis of the changes and/or by a comparison of the combined trends for all parameters with a knowledge base (preferably computerized) containing known engine conditions or problems. For example, in the described embodiment, if the combined trends of (a) ITT is gradually up, (b) NH is gradually down, (c) NL is gradually up and (d) Wf is gradually up, this may be indicative of a deteriorating high power turbine (HPT) condition in the engine requiring maintenance attention.

Now, in more detail, the analysis process is preferably executed in an algorithm of FIG. 4 as follows: A change from the baseline is identified 80 for each parameter of a series of n parameters, preferably through the process shown in FIG. 3, i.e. by comparing a data point of interest (e.g. the last data point in the data stream) to the baseline. The "change status" is the value (i.e. magnitude) of the change in the parametric data. The "change set" is the set of change statuses identified 80 for all n parameters analyzed. There is a total of $n^3$ change sets possible in a typical case, since a change status would typically be measured as either (1) an increase (between baseline and the examined data point), (2) a decrease or (3) status quo. Therefore, the particular change set identified at 80 is then matched 82 to one of the possible $n^3$ change sets. Using an appropriate knowledge base, which those skilled in the art will understand is typically a computer database containing (in this case) engine performance data acquired from simulation and/or field experience and which is considered "typical" and/or "desirable", the matched state is then correlated 84 to stored typical engine operating characteristics to identify possible performance patterns, such as a deterioration in performance due to a known condition.

In the event that a possible "problem" is identified through the comparison with the knowledge base, a possible problem identification code is determined or selected 86 by or from the knowledge base. An alert message is then generated 88, preferably with a recommendation of maintenance actions using, for example, a computerized maintenance manual for the particular engine or a list of troubleshooting procedures. The alert message is then preferably also sent 90 (such as, for example, an e-mail, fax transmission, a pager message, etc.) to a rendering unit for display to a service technician. (Alternately, the alert message may be recorded for later retrieval and viewing by service personnel.) The service technician may then perform 92 maintenance actions on the engine accordingly, as he or she deems appropriate. These maintenance actions may or may not be the proposed maintenance actions, as the service technician will preferably independently troubleshoot the situation before taking maintenance action. The service technician then preferably generates a maintenance action report which is used to update 94 the knowledge base for the future automatic analysis of other engine data. The system may thereby become more efficient and accurate as problems are detected and maintenance actions are carried out and recorded.

Figure 5A:
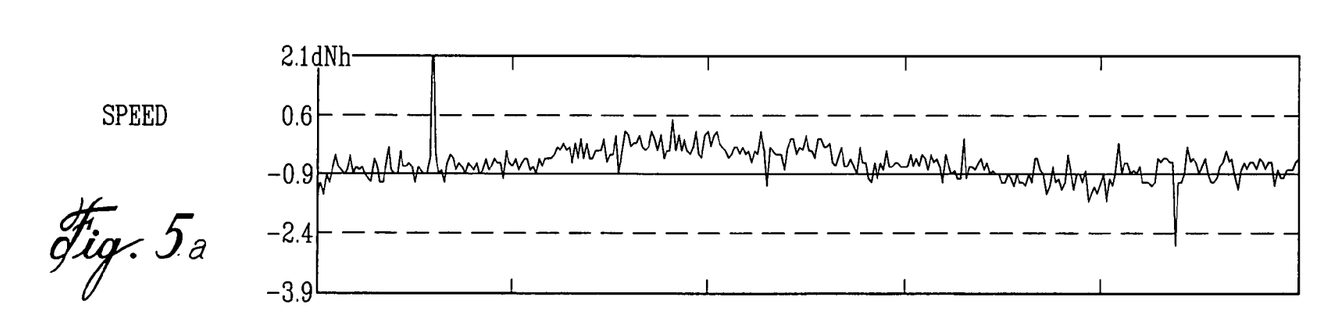
FIG. 5 shows a graphical plot of sample engine performance data for typical gas turbine, including high pressure compressor speed (NH), inter-turbine temperature (ITT) and fuel flow (Wf), in the unsmoothed condition.
Figure 5B:
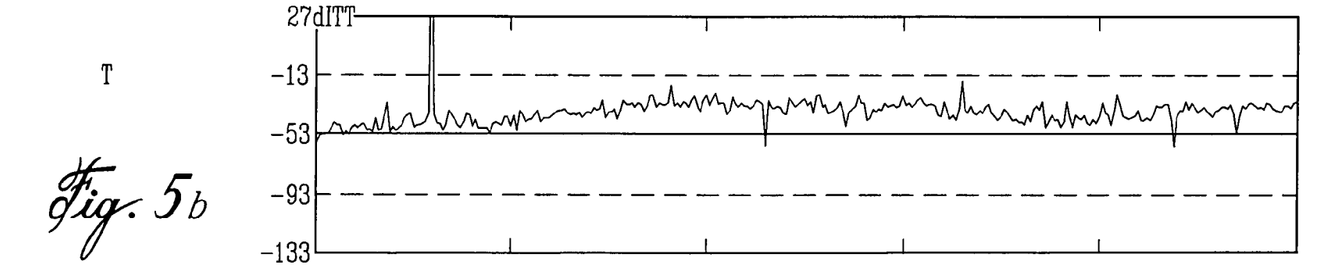
Figure 5C:
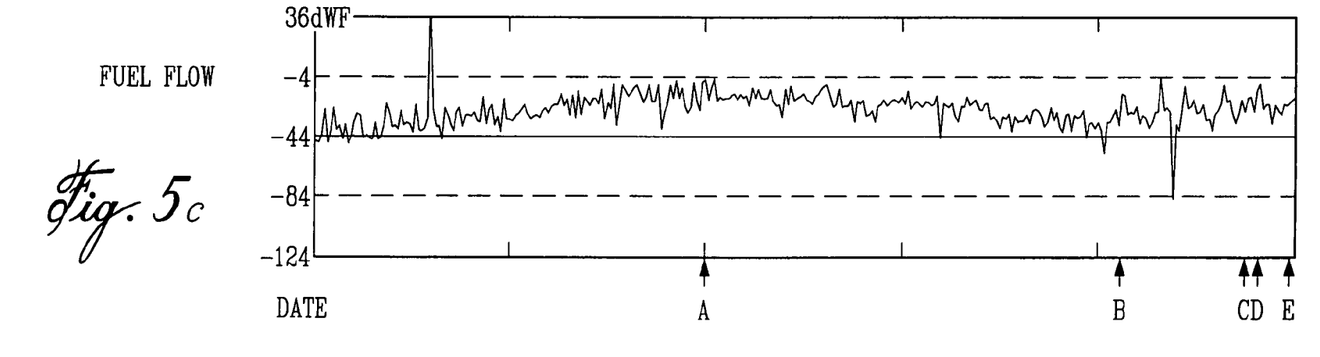
Figure 6A:
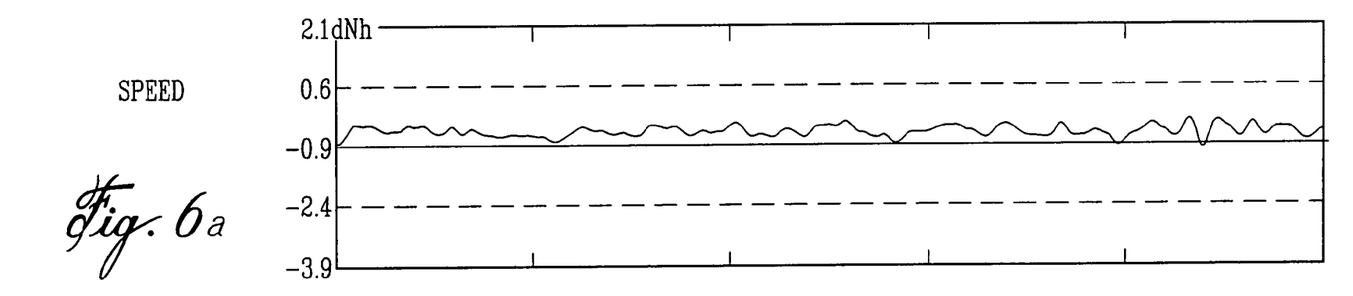
FIG. 6 shows the engine performance data of FIG. 5 in the smoothed condition.
Figure 6B:
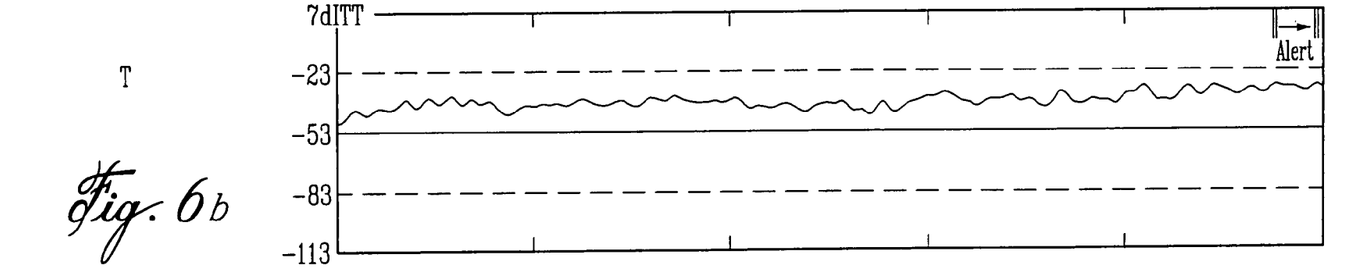
Figure 6C:
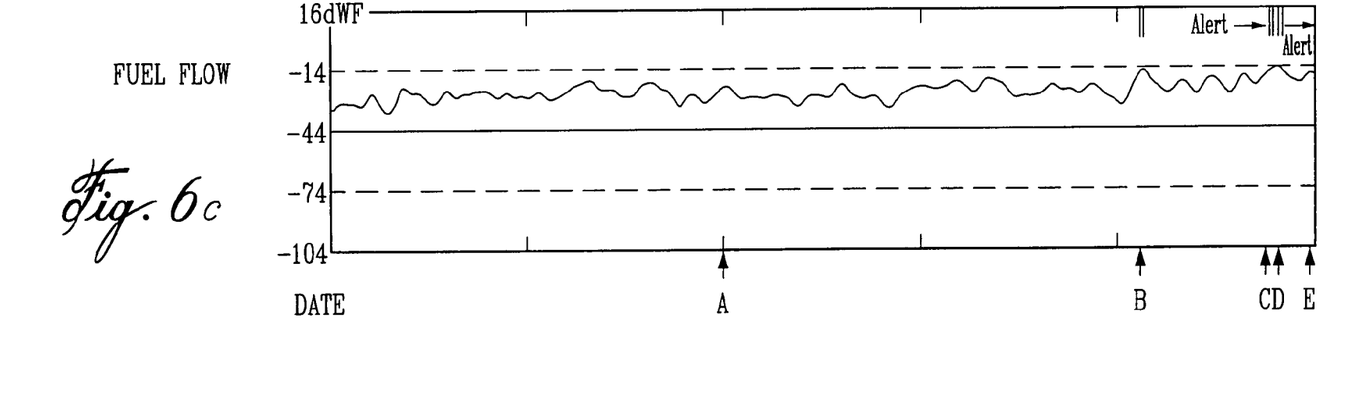

FIG. 5 shows example gas turbine engine performance data, including high compressor speed (NH) (graph a), inter-turbine temperature (ITT) (graph b) and fuel flow (Wf) (graph c), in the unsmoothed condition. FIG. 6 shows the example engine performance data of FIG. 5 but now in the filtered/smoothed condition after being processed according to the present invention. The filtering/smoothing and analysis processes of the present invention helps to avoid false alerts. If the analysis is based on the unsmoothed data (FIG. 5), there would likely have been many alerts generated, especially during the winter months (e.g. in FIGS. 5a, 5b and 5c, at Point A) when many parameters are affected by a seasonal effect. By using both the seasonal (low frequency) and general smoothing described above, in this example, the actual alert would occur only around Point D when evidence of performance deterioration of the engine begins to become apparent. In this example, sample threshold values for alerted generation could be 0.75% for NH, 15° C. for ITT and 15 pph for Wf. In FIG. 6, graph b, an alert is only generated at Point C and, similarly, in FIG. 6, graph c, an alert is generated at Point D.

Figure 7:
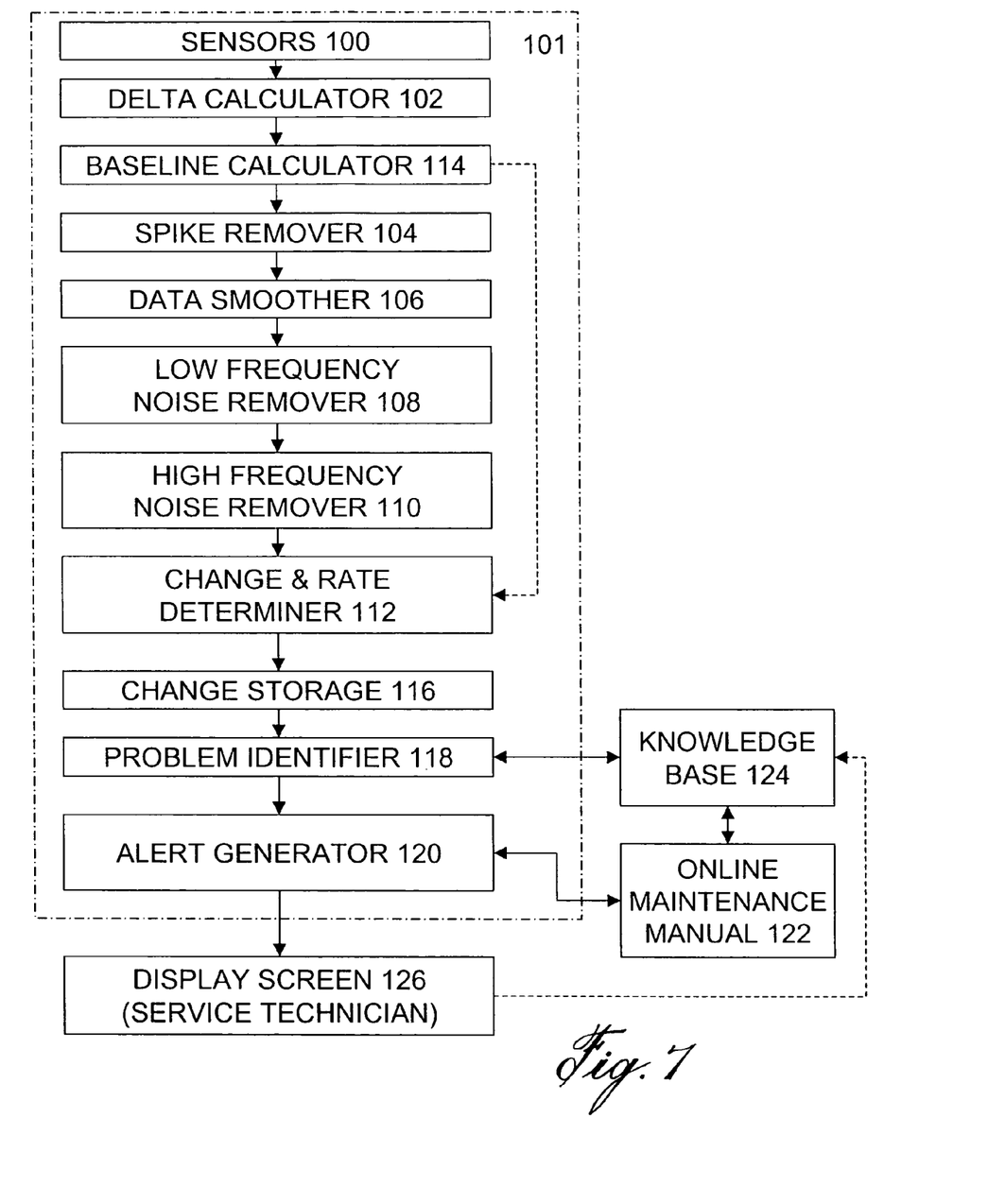
FIG. 7 is a block diagram of a system according to the present invention.

FIG. 7 is a block diagram of the main components of a preferred embodiment of a system according to the present invention. While illustrated in the block diagrams as groups of discrete components communicating with each other via distinct data signal connections, it will be understood by those skilled in the art that, in the preferred embodiment described, the steps are performed by a combination of hardware and software components. Some components will be implemented by a given function or operation of a hardware or software system, and many of the data paths illustrated are implemented by data communication within a computer application or operating system. The structure illustrated is thus exemplary only, as other means of effecting the invention will be evident which do not depart from the scope of what is disclosed and claimed herein. It will be also understood that some components may require human intervention.

Sensors 100 collect sensor data. The data may be relayed in real time therefrom, or stored for later relay. Preferably, upon the end of each operation cycle (e.g. aircraft flight), sensor data is relayed to the system 101. The sensor data from the sensors 100 is then used by the delta calculator 102 to determine the delta, and then the delta is used by "baseline calculator" 114 to calculate the baseline information, as described above. The delta information is then passed through a series of algorithms to filter out the noise, both high and low frequency noise, including seasonal effect in this example, and spikes. The preferred order is as follows: a spike remover 104, a data smoother 106, a low frequency (seasonal effect) noise remover 108 and a high frequency noise remover 110. The filtered delta information is then used by the change and rate of change determiner 112 together with the baseline information coming from the baseline calculator 114 to determine the change which occurred for the parameter and the related rate of change. Typically, the change would be calculated only in reference to the last data point in the set, though any number of data points could be examined. This change is then preferably stored in a change storage 116. Changes for all parameters of concern for a particular engine are then retrieved and sent to the problem identifier 118. The problem identifier 118 then uses engine troubleshooting data from the knowledge base 124 to identify a potential problem. If the set of changes for all parameters found by the rate of change determiner could apply to more than one problem, all problems are preferably identified. The identified problem(s) is then sent to the alert generator 120 which creates an alert message detailing the problem. This alert generator also communicates with a maintenance procedure generator (e.g. online manual) which prepares a suggested maintenance protocol with specific maintenance procedures, communicating with the knowledge base 124, as needed. The alert message and proposed maintenance procedures are sent to a display terminal 126 for notification of, and review by, a service technician. The service technician, after determining the appropriate action and preferably taking it, then enters a maintenance report into the knowledge base 124, for the purpose of updating and improving the knowledge base 124.

It should be noted that the present invention can be carried out as a method, can be embodied in a system, a computer readable medium or an electrical or electro-magnetical signal. Aspects of it may be executed parallelly or serially, in real time or off-line, manually or automatically, as desired, according to the desires of, and limitations understood by, the skilled reader.

It will be understood that numerous modifications thereto will appear to those skilled in the art. The method steps described above have been described as occurring sequentially for the sake of convenience, but may not necessarily require sequential execution, depending on the data requiring analysis. For example, the baseline may be determined in parallel to one or more filtering steps. Low frequency (and/or high frequency) noise and spikes may be removed from the data either before or after smoothing, though the order may affect the accuracy of the data in some cases, as will be understood by those skilled in the art. A skilled person will also understand that all method steps may not be required in every data analysis. For example, a baseline for a given data set may not require calculation, but rather simple selection. Likewise, some data sets may not require low frequency filter, since the measured parameters may be insensitive to any low frequency noise present. In the embodiment described above, while inter-turbine temperature (ITT) may be sensitive to seasonal environmental variations, other parameters such as compressor speed (NH) may be less so.

Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for comparing a data set to a baseline value for use in data analysis of said data set having a plurality of data points, comprising:
   providing said data set to be analyzed;
   locating potentially bad data points in at least a portion of said data set using an odd-man out recursive technique;
   preparing a baseline set by discarding said potentially bad data points from said at least a portion of said data set;
   calculating a baseline value from said baseline set;
   comparing said data set to said baseline value for use in said data analysis; and
   producing an alert using said comparing of said data set to said baseline value.

2. The method as claimed in claim 1, further comprising ordering said data points in chronological order prior to said locating.

3. The method as claimed in claim 2, wherein said at least a portion has data points from an earliest time value.

4. The method as claimed in claim 3, wherein said at least a portion has 15 data points.

5. The method as claimed in claim 1, wherein said locating comprises performing a linear regression on all points of at least a portion of said data set except a first point considered, calculating a standard deviation for all points of said at least a portion of said data set except said first point considered, repeating said steps of performing and calculating a standard deviation until said linear regression and said standard deviation are calculated for each point considered;
   wherein said discarding comprises discarding data points with a lowest standard deviation; and wherein said calculating a baseline value from said baseline set comprises calculating an intercept of said baseline set to determine said baseline value.

6. The method as claimed in claim 5, further comprising performing a second linear regression on said baseline set prior to said calculating said intercept.

7. The method as claimed in claim 1, further comprising, after said step of providing said data set:
providing predicted values corresponding to said data set;
calculating a difference between each of said data points of said data set and said predicted values to obtain difference data;
wherein said step of locating and preparing are carried out using said difference data.

8. The method as claimed in claim 7, wherein said predicted values are obtained from a set of equations representing a model for said data set.

9. The method as claimed in claim 1, further comprising determining a relative change in said baseline value based on said discarding and determining a target number of data points to discard based on a significance of said relative change.

10. A system for comparing a data set to a baseline value for use in data analysis of said data set having a plurality of data points, comprising:
a data provider for providing said data set to be analyzed;
an odd-man out locator for locating potentially bad data points in at least a portion of said data set using an odd-man out recursive technique;
a data discarder for preparing a baseline set by discarding said potentially bad data points from said at least a portion of said data set; and
a baseline calculator for calculating a baseline value from said baseline set;
a comparator for comparing said data set to said baseline value for use in said data analysis; and
producing an alert using said comparing of said data set to said baseline value.

11. The system as claimed in claim 10, further comprising a data sorter for ordering said data points in chronological order prior to said locating.

12. The system as claimed in claim 11, wherein said at least a portion has data points from an earliest time value.

13. The system as claimed in claim 12, wherein said at least a portion has 15 data points.

14. The system as claimed in claim 10, wherein said odd-man out locator comprises a linear regression calculator for performing a linear regression on all points of at least a portion of said data set except a first point considered, calculating a standard deviation for all points of said at least a portion of said data set except said first point considered, repeating said steps of performing and calculating a standard deviation until said linear regression and said standard deviation are calculated for each point considered;
wherein said data discarder discards data points with a lowest standard deviation; and
wherein said baseline calculator calculates an intercept of said baseline set to determine said baseline value.

15. The system as claimed in claim 14, further comprising a second linear regression calculator for performing a second linear regression on said baseline set prior to said calculating said intercept.

16. The system as claimed in claim 10, further comprising:
a comparison provider for providing predicted values corresponding to said data set;
a difference calculator for calculating a difference between each of said data points of said data set and said predicted values to obtain difference data, wherein said difference data is provided to said odd-man out locator for said locating.

17. The system as claimed in claim 16, wherein said comparison provider obtains said predicted values from a set of equations representing a model for said data set.

18. The system as claimed in claim 10, further comprising a change determiner for determining a relative change in said baseline value based on said discarding and determining a target number of data points to discard based on a significance of said relative change.

* * * * *